Patented July 11, 1950

2,515,133

UNITED STATES PATENT OFFICE

2,515,133

LUBRICATING GREASE

Arnold J. Morway, Clark Township, Union County, N. J., assignor to Standard Oil Development Company, a corporation of Delaware No Drawing. Application June 30, 1948,
Serial No. 36,291

4 Claims. (Cl. 252—42.1)

The present invention relates to improvements in lubricating greases and particularly to improvements in the oxidation resistance and resistance to discoloration of high-grade light-colored greases.

It has been previously suggested in the prior art that lubricating oils and greases may be given considerable resistance to oxidation by incorporating therein various types of oxidation inhibitors. Among those which have been found useful are various aliphatic and cyclo aliphatic and aromatic amines. Thus toluidine, alpha-naphthylamine, dicyclo-hexyl amine, triethanol amine and the like have been suggested. A particularly effective oxidation inhibitor which has been rather widely used in the past is phenyl alpha-naphthylamine.

In soap thickened lubricating greases, especially those of light color, considerable discoloration commonly results when phenyl alpha-naphthylamine is used as the oxidation inhibitor, particularly when it is added at elevated temperatures during manufacture. The greases also tend to become purple in color when exposed to light, the extent of the discoloration depending on the time exposed and strength of the light, e. g. a two hour exposure to direct sunlight being sufficient to turn a yellow grease to a deep brown or purple color. In the manufacture of greases, the kettles are not completely cleaned from batch to batch of the same grease. Therefore any holdup in the kettle of grease containing the phenyl alpha-naphthylamine will darken future batches to a considerable extent. Thus to obtain uniform color from batch to batch requires extensive and time consuming cleaning of the equipment between batches. To some extent this is true also of related compositions such as phenyl beta-naphthylamine although the latter gives somewhat less discoloration.

In the patent to Zimmer and McNulty, No. 2,340,036 there is disclosed an alkyl phenol formaldehyde ammonia condensation product which is useful in preventing the discoloration of light hydrocarbons such as motor fuels and the like. As described in said patent the condensation product may be formed by condensing an alkyl phenol such as para-isooctyl phenol or di-isobutyl phenol with formaldehyde or paraformaldehyde in the presence of a hydrogen-halide acid such as strong hydrochloric acid. The resulting phenolic condensation product is thereafter reacted with a base material, preferably a nitrogenous base such as ammonia or an amine compound or the like. As described in said patent, it is desirable to have an oil-soluble compound and oil solubility may be increased by increasing the length of the alkyl substituent attached to the phenol nucleus. The reaction conditions required are well known and are described in said patent in detail.

Briefly, the condensation product may be prepared by adding 30 mols of paraformaldehyde to a large excess of hydrochloric acid, adding 10 mols of an alkyl phenol, e. g., isooctyl-phenol or diisobutyl phenol, together with an equal amount of benzene and permitting the reaction, which is exothermic, to proceed. HCl gas is added while stirring is continued about 1½ hours. Thereafter, the upper benzene layer is separated from the lower hydrochloric acid layer. The benzene solution is mixed with an alcohol, e. g., 98% isopropyl alcohol, containing anhydrous ammonia. This reaction proceeds very actively and cooling or pressure is required. Gaseous ammonia may be added in lieu of the alcohol solution. The resultant product is water-washed and blown with nitrogen to remove the benzene, leaving a brittle, resinous, oil-soluble product.

Also as described in a copending application by Alan Beerbower and John C. Zimmer, Serial No. 771,562, filed August 30, 1947, it has been found advantageous to combine a condensation product of the same general type as that described in said Zimmer and McNulty patent with phenyl alpha-naphthylamine in substantially equal proportions to improve oxidation resistance of lubricating greases. This is described in said application as being particularly applicable to greases used for the lubrication of anti-friction bearings.

The composition described in said Beerbower and Zimmer application has very desirable properties but is not suitable for use in light-colored greases of high quality where discoloration is objectionable. Greases containing substantial quantities, for example 0.5% or more of phenyl alpha-naphthylamine, show considerable discoloration on exposure to high temperatures or to light. While the discoloration does not necessarily represent a degradation in quality, it gives a bad appearance to the grease and is likely to cause customers to feel that the lubricant is not of good quality. This is particularly true because the degree of discoloration is not by any means uniform from one batch to another. In some cases a batch of grease may show only moderate darkening or discoloration where in others using the same quantities and types of antioxidants considerable discoloration results. Where the grease differs in color from batch to batch, questions may be raised by consumers as to whether any changes have been made in its formulation or whether poor quality materials have been employed in its manufacture.

It is an object of the present invention to prepare light colored lubricating greases having effective resistance to oxidation and to metal activation which are also substantially free from discoloration of the character referred to above. It has been found that this may be accomplished by the use of a combination of a relatively very small amount of phenyl beta-naphthylamine, which, per se, is a known oxidation inhibitor of some limited utility, together with a relatively larger amount of the above-mentioned condensation product of di-isobutyl phenol with formaldehyde and ammonia. The latter material may also be described as a di-isobutyl phenol methyl amine. For the purposes of the present invention, the quantity of condensation product employed should preferably exceed the quantity of phenyl beta-naphthylamine by several times.

It appears that a combination in a slightly alkaline grease of the condensation product of di-isobutyl phenol and para-formaldehyde with ammonia, combined with a small proportion of phenyl beta-naphthylamine as distinguished from the combination of the same condensation product with larger quantities of phenyl alpha-naphthylamine in prior art greases, permits the reduction of the phenyl beta-naphthylamine to almost negligible proportions with little or no discoloration of the grease while still giving excellent protection against oxidation. This combination of inhibitor is effective also in preventing the discoloration of copper and it appears to be an effective antioxidant in the presence of a copper catalyst. The effectiveness of these materials is particularly outstanding in greases which contain a slight amount of free alkalinity. Apparently the condensation product has a synergistic effect on the phenyl beta-naphthylamine since the condensation product by itself is relatively ineffective as an anti-oxidant. The phenyl beta-naphthylamine when used alone in small proportions, e. g. a concentration of the order of 0.1%, also is relatively ineffective. The combined effect of these two materials and particularly in alkaline greases, as will be shown in the examples following is much greater than their additive effect as inhibitors. In addition, the condensation product appears to act as a copper passivator. The exact mechanism is not fully understood but it is possible that a complex is formed with the metal which prevents its acting as a catalyst. In this respect the condensation product appears to be at least as effective as some of the well-known metal deactivators which have been used in lubricants and the like, such as the condensation product of ethylene diamine and salicylaldehyde.

*Example 1*

A base grease which is widely marketed as a high-grade lubricant was used for comparative oxidation tests. It had the following composition:

| | Weight, Percent |
|---|---|
| Rapeseed oil | 29.0 |
| Sodium hydroxide | 5.92 |
| Sodium sulfonates | 0.50 |
| Low cold test naphthenic type mineral oil of 55 SSU viscosity at 210° F | 64.58 |

This grease contained about 30% soap by weight and had excess alkalinity of about 0.3% calculated as NaOH. It also contains a small amount, e. g. 1 to 3% of glycerine, and a small amount, up to about 2%, of the soaps of lower fatty acids which form upon saponification.

The Norma-Hoffmann bomb oxidation test was employed as the means of evaluating the greases containing the inhibitors. The color changes occurring in the grease were tested by coating a small watch glass with the test greases and exposing the grease to ultraviolet light for 40 hours on a rotating turn table. The original grease was light tan in color and the test greases were rated from 0 for no change in color from the original grease to 10 when turned completely black. These results are listed below:

TABLE 1

*Norma-Hoffmann bomb oxidation tests*

| Inhibitors, Wt. Per Cent | Copper Catalyzed Hrs. for Pressure Drop | | Color Rating After 40 Hours Exposure to Ultraviolet Light |
|---|---|---|---|
| | 5 p. s. i. | 25 p. s. i. | |
| None | 16 | 26 | 0 |
| 1.0% Phenyl alpha-naphthylamine | 110 | 152 | 7 |
| 1.0% Phenyl beta-naphthylamine | 112 | 184 | 6 |
| 2.5% Condensation product of di-isobutyl phenol and paraformaldehyde and ammonia in 20% concentration in mineral oil | 52 | 86 | 1 |
| 2.5% 20% Concentration of condensation product<br>0.1% Phenyl beta-naphthylamine | 80 | 148 | 2 |
| 2.5% 20% Concentration of condensation product<br>1.0% Phenyl beta-naphthylamine | 96 | 154 | 7 |

The following data show a direct comparison between phenyl alpha-naphthylamine and phenyl beta-naphthylamine combined with the condensation product mentioned above as oxidation inhibitors in the absence of a copper catalyst. The combination of phenyl alpha-naphthylamine and the condensation product performed so poorly without the catalyst that tests with catalyst were considered useless. By comparison, when phenyl beta-naphthylamine was substituted for the alpha product, the resistance to oxidation was multiplied to a remarkable degree, even though only 0.1% of each was used. The standard Norma-Hoffmann bomb test was employed.

| Mineral Lubricating Oil+ | Hours for Pressure Drop | |
|---|---|---|
| | 5 p. s. i. | 25 p. s. i. |
| (a) 2.5% by wt., of 20% concentration of condensation product and 0.1% phenyl alpha-naphthylamine | 54 | 156 |
| (b) 2.5% by wt., of 20% concentration of condensation product and 0.1% phenyl beta-naphthylamine | 318 | ¹ 400+ |

¹ The pressure drop at 400 hours was only 10 p. s. i.

It will be noted from the foregoing that 1% of phenyl alpha-naphthylamine and the same quantity of phenyl beta-naphthylamine gave fairly good protection against copper catalyzed oxidation in the Norma-Hoffmann bomb test, but the color deteriorated very markedly. On the other hand, 0.5% of the condensation product of di-isobutyl phenol and para-formaldehyde (added as 2.5% of a 20% oil concentration) gave materially less protection against oxidation, 52 hours as compared with 110 and 112 respectively. The product was substantially free, however, from discoloration. By adding only 0.1% of phenyl beta-naphthylamine the oxidation resistance was increased to 80 hours for a 5 lb. pressure drop in the presence of copper catalyst and the color rating was "2" which is considered very satisfactory. By contrast, the addition of as much as 1% of phenyl beta-naphthylamine alone increased the oxidation resistance only moderately and resulted in very considerable discoloration.

*Example 2*

Various inhibitors were added to the base grease of Example 1, which is a commercial anti-friction bearing grease recommended for long life and high temperature lubrication, and the various samples were subjected to the standard NLGI—ABCC high speed-high temperature spindle test. This test is well known in the art and is described by the National Lubricating Grease Institute's ABCC Bulletin No. 5.

In the following data it will be noted that the combination of as much as 1.0% by weight, based on the total composition, of phenyl alpha-naphthylamine and 0.5% of a conventional metal deactivator (salicylaldehyde condensed with propylene diamine) was considerably inferior to a combination of only 0.1% of phenyl beta naphthylamine with 0.5% of the condensation product of paraformaldehyde and di-isobutyl phenol, previously mentioned. Tested in glass, the latter combination was about three times as effective as the former. In the presence of copper the difference was not so great but the latter combination still showed some superiority over the former which includes a relatively large quantity, 1%, of phenyl alpha-naphthylamine and a recognized effective metal deactivator. Using 0.5% of phenyl alpha-naphthylamine alone as inhibitor the oxidation life in glass was 144 hours which is fairly good but only 8 hours in copper which is quite unsatisfactory. The data of the high speed spindle test are shown in Table 2.

TABLE 2

| Grease | Norma-Hoffmann Bomb Life, Hours to 5 lb. drop in pressure | | Grease Life at 300° F. and 10,000 R. P. M., Hours |
|---|---|---|---|
| | Glass | Copper | |
| Base Grease | 60 | 16 | 175 |
| Base Grease+ 1.0% Phenyl alpha-naphthylamine 0.5% Condensation product of salicylic aldehyde and propylene diamine | 112 | 66 | 366 |
| Base Grease+ 0.5% Condensation product of paraformaldehyde and isooctyl phenol, reacted with ammonia 0.1% Phenyl beta-naphthylamine | 316 | 80 | 397 |
| Base Grease+0.5% Phenyl alpha-naphthylamine | 144 | 8 | 225 |

It appears from the foregoing that where copper staining or catalytic oxidation by copper appear to be a principal objection, the condensation product of di-isobutyl phenol and para-formaldehyde, reacted with ammonia, may be used alone as an inhibitor. For general oxidation resistance, however, and in order to prevent discoloration, the combination of about 0.5% by weight (2.5% of the 20% solution) of the condensation product with 0.1% of the phenyl beta-naphthylamine appears to be very effective. It will be understood that the proportions will be varied somewhat. The quantity of phenyl beta-naphthylamine may be as little as 0.02 or as much as 0.5% by weight based on the total composition, although the latter quantity is excessive if discoloration is to be substantially avoided. Where maintenance of original color is important, the quantity of phenyl beta-naphthylamine should not exceed about 0.2%. The quantity of condensation product of di-isobutyl phenol and paraformaldehyde should be not less than 0.2% and ordinarily not more than about 1% by weight based on the finished composition.

As indicated in the above examples, the inhibitors of oxidation and discoloration which characterize this invention may be applied to various types of greases provided such greases have no free acidity. They are most useful in greases having 0.01 to 1% alkalinity but are not useful in greases having excess acidity. They are effective either in mineral oil-base greases or in greases prepared using esters such as di-2-ethyl hexyl sebacate in place of the mineral oil. They may also be applied to various other greases of mixed base and of various oil or synthetic oil content. A grease containing a mixture of light mineral oil, for example one having a viscosity of about 35 SSU at 210° F. combined with a dibasic acid ester such as di-2-ethyl hexyl sebacate can also be improved by the use of the combined oxidation and discoloration inhibitor described above.

The elimination of the previously used phenyl alpha-naphthylamine and the substitution of a very small quantity of phenyl beta-napthylamine in combination with the condensation product of di-isobutyl phenol and para-formaldehyde or the like, reacted with ammonia, particularly characterizes the present invention. It should be understood, however, that various equivalent materials including the metal salts of this compound may be substituted for the ammonia salt of the condensation product, these being described in detail in the patent to Zimmer and McNulty, No. 2,340,036 referred to above. The alkyl phenols containing 4 to about 12 carbon atoms in aliphatic substituents are especially preferred as the first element of the condensation product. They may be condensed with para-formaldhyde or with the reaction product of hydrochloric acid and an aldehyde with or without further condensation with ammonia or as described in said patent. The resinous polymer or condensation product which results may be referred to generally as an ammonium or related derivative of alkyl phenol-formaldehyde-hydrogen chloride condensation product.

Greases containing the improved oxidation inhibitors described above have another and unexpected advantage in showing reduced tendency to cause skin irritations to those who handle the product. In a series of medical tests 16 adult subjects handled a commercial high quality soda base grease made with about 75% mineral oil and having an original rapeseed oil content before saponification of about 22%, saponified with excess NaOH to provide free alkalinity (0.3 to 0.6 free NaOH). This material contained about 22 or 23% soap and a small amount of glycerine, e. g. up to about 2%. With the prior art product, 4 of the 16 test subjects showed positive dermatitis reactions whereas with the inhibited grease containing 0.1% by weight of phenyl beta-naphthylamine and 0.5% of the condensation product (of formaldehyde and octyl phenol in the presence of ammonia) no positive reactions were noted.

The cause of such skin irritations is not definitely known but may be due to the erucic acid in rapeseed oil. As the rapeseed oil content of the grease is increased the tendency to cause skin irritations also appears to increase. The use of an inhibitor which not only improves oxidation resistance but also reduces probabilities of causing skin irritations to those who handle the grease has obvious advantages.

The greases to which the anti-oxidant materials described above may be added may be either hard or soft and may comprise varying quantities of soaps, minerals, oils and other conventional ingredients, but in any case they should not contain any free acid. Their pH value must be at least 7 and preferably slightly higher. They may include from 3% to 25 or 30% by weight of soap and they also may include conventional tackiness agents, extreme pressure additives, viscosity index improvers and the like as will be understood in the art. The invention is particularly applicable to the greases of high soap content, e. g., those containing about 22 to 30% by weight of soap, especially rapeseed oil soaps causing skin irritations as noted above.

Instead of reacting formaldehyde or paraformaldehyde, which is equivalent, with the alkyl phenol, preferably diisobutyl phenol, and subsequently reacting the product with ammonia, the condensation product may be made by the alternative method of reacting hexamethylene tetramine directly with the phenol or alkylated phenol. The hexamethylene tetramine breaks down into ammonia and formaldehyde. The general reaction conditions required are set forth in the aforesaid patent to Zimmer and McNulty. The combined inhibitor is effective in various greases based on soaps of aliphatic fatty oils and acids. Other obvious alternatives will suggest themselves to those skilled in the art.

What is claimed is:

1. A lubricating grease composition having a pH value of at least 7.0 and consisting essentially of a liquid oily lubricant thickened to a grease-like consistency with 3 to 30% by weight, based on the total composition, of metal soap of aliphatic fatty material, 0.2 to 1% of a resinous, oil-soluble condensation product of diisobutyl phenol and a formaldehyde reacted with a nitrogen base, and 0.02 to 0.5% of phenyl beta-naphthylamine.

2. A slightly alkaline lubricating grease consisting essentially of mineral lubricating oil thickened to a grease-like consistency with sodium soap of aliphatic fatty materials, 0.1 to 1% by weight based on the total composition of a resinous, oil-soluble condensation product of di-isobutyl phenol and para-formaldehyde reacted with ammonia, and 0.02 to 0.2% of phenyl beta-naphthylamine.

3. A slightly alkaline lubricating grease consisting essentially of about 65 to 75% by weight of mineral oil, 22 to 30% of sodium soap of rape seed oil, about 0.5% of a resinous, oil-soluble condensation product of di-isobutyl phenol and paraformaldehyde reacted with ammonia, about 1 to 3% of glycerine and about 0.1% phenyl beta-naphthylamine.

4. A lubricating grease composition having a pH value of at least 7.0 and consisting essentially of a liquid oily lubricant thickened to a grease consistency with about 22 to 30% by weight, based on the total composition, of metal soap of aliphatic fatty materials, 0.2 to 1% of a resinous, oil soluble condensation product of di-isobutyl phenol and hexamethylene tetarmine, and 0.02 to 0.5% of phenyl beta-naphthylamine.

ARNOLD J. MORWAY.

REFERENCES CITED

The following references are of record in the file of this patent:

UNITED STATES PATENTS

| Number | Name | Date |
|---|---|---|
| 2,255,597 | Downing | Sept. 9, 1941 |
| 2,289,748 | Beerbower et al. | July 14, 1942 |
| 2,340,036 | Zimmer et al. | Jan. 25, 1944 |
| 2,348,638 | Mikeska et al. | May 9, 1944 |
| 2,360,631 | Zimmer et al. | Oct. 17, 1944 |
| 2,364,502 | Zimmer et al. | Dec. 5, 1944 |
| 2,369,705 | Woodward et al. | Feb. 20, 1945 |
| 2,401,957 | Pedersen et al. | June 11, 1946 |
| 2,453,850 | Mikeska et al. | Nov. 16, 1948 |